Nov. 30, 1965  G. J. WALKEY  3,220,910

REMOVABLE MANDREL FOR FORMING RESIN REINFORCED WOUND ARTICLES

Filed March 26, 1962  2 Sheets-Sheet 1

INVENTOR.
GEORGE J. WALKEY
BY George C. Sullivan
Agent

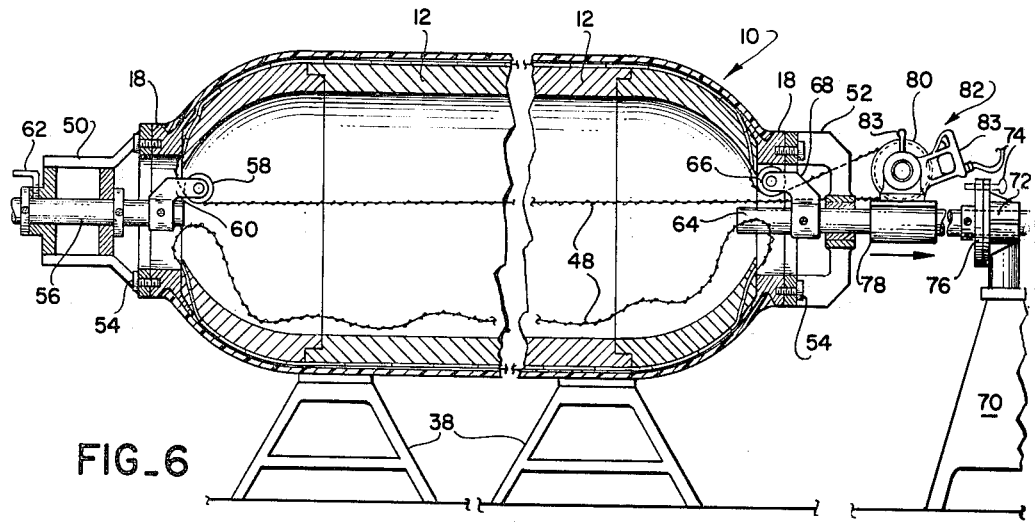
FIG_6
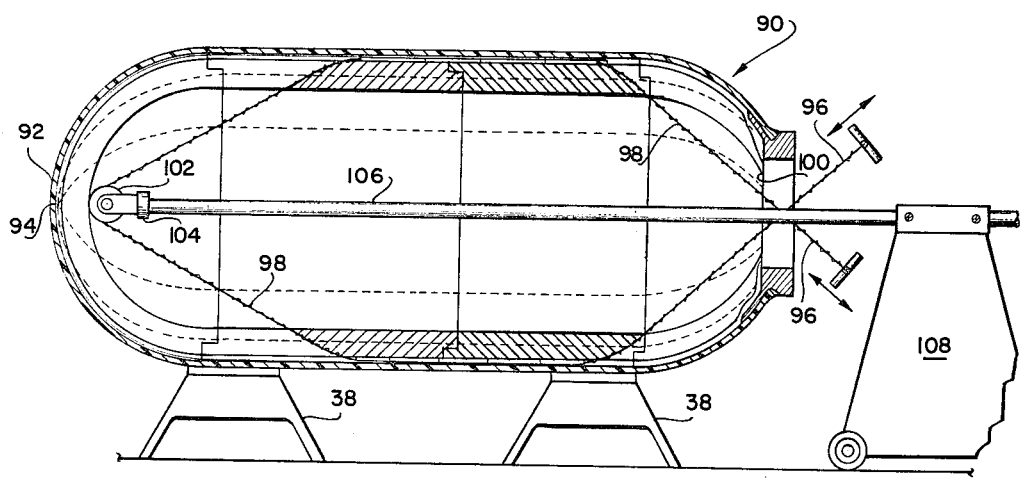
FIG_7
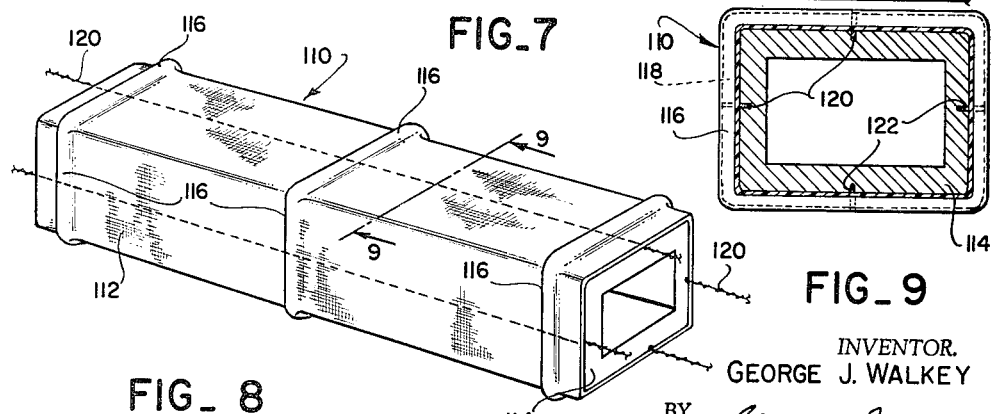
FIG_8  FIG_9
INVENTOR.
GEORGE J. WALKEY
BY
*George C. Sullivan*
Agent

United States Patent Office 3,220,910
Patented Nov. 30, 1965

3,220,910
REMOVABLE MANDREL FOR FORMING RESIN REINFORCED WOUND ARTICLES
George J. Walkey, Burbank, Calif., assignor to Lockheed Aircraft Corporation, Burbank, Calif.
Filed Mar. 26, 1962, Ser. No. 182,414
6 Claims. (Cl. 156—425)

This invention relates to the manufacture of reinforced plastic articles or the like, and more particularly to an improved plaster or plaster-like mandrel which can be readily removed from the completed article.

This invention is particularly useful in the manufacture of such articles as ducting, pipes, pressure vessels, rocket motor cases, tooling fixtures, mock up parts, and the like, wherein the articles have an open end. For use in applications requiring high strength and light weight, as in the aerospace industry, these articles are frequently made of resin-impregnated glass fiber laminate, glass fiber tape, glass filaments, glass fiber roving, wire, and other types of reinforced plastics. Generally, these reinforced plastic parts are laid up or wound on mandrels and then heat cured to produce the finished article.

Of the various materials used for mandrels, plaster is very commonly used. As is known, plaster mandrels are easy to fabricate, have good dimensional stability and mechanical strength, and are economical. Therefore, they are very much favored for the manufacture of articles on short production runs or for the manufacture of articles which require frequent design changes. However, in the manufacture of such articles as aircraft ducting which contain reinforcing beads and rocket motor cases which have end closures of reduced diameter, they frequently are not easily removed from the finished articles because of the configuration of these articles and the size and mechanical strength of the mandrels. In these cases, the usual practice is to chip the mandrel away through the end openings or to tap the finished article with a rubber mallet with the purpose of loosening and cracking the plaster. However, these methods are time consuming and frequently lead to damaged parts. In the case of large products or products where the end openings are small, even these methods are not practical. Thus, other techniques are resorted to, such as the use of water soluble salt mandrels, mechanical mandrels which can be collapsed or contracted, and inflatable mandrels. However, these also have their drawbacks. The salt mandrels require high heat to fuse and cast, are hygroscopic, and require high pressure hot water to leach out, necessitating expensive and space-occupying equipment. The mechanical mandrels are generally quite costly and are time consuming in their setup and disassembly. The inflatable mandrels do not retain dimensional accuracy because of leakage.

Thus, it is a general object of the present invention to provide an improved plaster or plaster-like mandrel which is readily removable from the finished product without damage to the product.

It is another object of the present invention to provide an improved plaster or plaster-like mandrel which can be easily fabricated without the use of special tools or processes and which offers substantial reductions in manufacturing time and capital outlay when compared to the mandrels now being used.

In a specific practice of the present invention, a plaster mandrel is first cast in molds by conventional techniques. Then longitudinal grooves are routed into the surface of the mandrel and lengths of a sheathed cutting tool, such as a round saw, are embedded in the grooves, with a short length of the tool extending beyond the ends of the mandrel. The grooves are faired in with a material such as patching plaster to provide a smooth mandrel exterior. After the reinforced plastic article is fabricated on the mandrel and cured in the usual manner, suitable handles are attached to the ends of the tool and the tool is manipulated from each end of the mandrel to cut the mandrel into segments which are easily removable through the end opening.

Other features and advantages of the present invention will become apparent from the following detailed description of typical forms and applications of the invention taken in conjunction with the accompanying drawings in which:

FIGURE 6 is an elevational view, partly in section, of a plaster mandrel for a rocket motor case in accordance with the present invention, showing a typical application of power means to the cutting tool;

FIGURE 7 is an elevational view, partly in section, of another plaster mandrel in accordance with the present invention, said mandrel being used for the manufacture of a rocket motor case having a closed end;

FIGURE 8 is a perspective view of a typical piece of aircraft ducting made on a mandrel in accordance with the present invention; and FIGURE 9 is an enlarged, sectional view taken along the line 9—9 of FIGURE 8.

Figure 1:
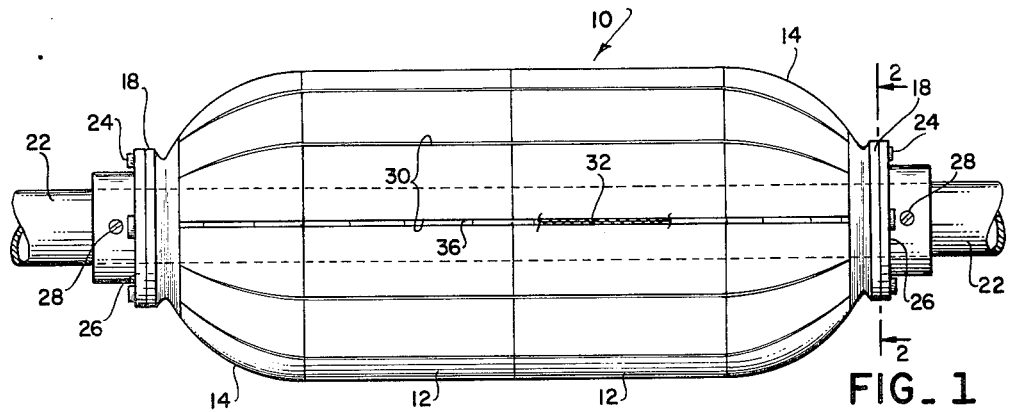
FIGURE 1 is an elevational view of a typical plaster mandrel in accordance with the present invention which is used in the manufacture of a solid propellant rocket motor case.
Figures 2, 3, 5:
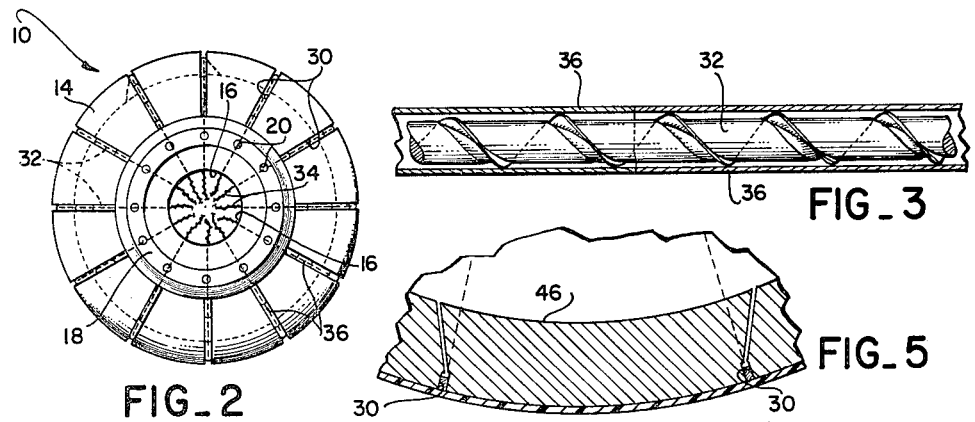
FIGURE 2 is an end view of the mandrel taken along the line 2—2 in FIGURE 1.
FIGURE 3 is an enlarged elevational view of a cutting tool used in the present invention.
FIGURE 5 is a fragmentary, sectional view of the mandrel taken along the line 5—5 in FIGURE 4, showing the initial mandrel segment cut as a keystone.

In FIGURES 1 and 2, the present plaster mandrel, shown generally as 10, is cast from any of the commonly available casting plasters and may be reinforced with hemp fibers, chicken wire, or the like. To facilitate fabrication of the mandrel, the two cylindrical body sections 12 and the two end sections 14 are cast separately in molds (not shown) and then assembled. End sections 14 have openings 16 which may have diameters ranging from 10 to 40% of the diameter of the body sections 12. Metallic end fittings or collars 18 fit around the openings 16. The collars have bolt holes 20 which provide attaching means for fabrication tools and for rocket parts in later assembly of the motor. The collars and mandrel sections are assembled by passing them through a spindle 22 of a winding machine (not shown). The assembled mandrel is secured to the spindle at each end by means of mounting bolts 24 passing through collar 18 and an end plate 26 fixed to the spindle 22 by set screw 28.

Then, longitudinal grooves 30 are cut or routed into the surface of the mandrel. Typically, in a mandrel having a thickness of about 3 inches, these grooves may be about ¼ inch deep and about ¼ inch wide. The grooves are spaced so that the maximum arc or distance between them will be less than the diameter of the end opening 16. Then, lengths of a cutting tool, such as a round saw 32 (FIGURE 3), are placed into the grooves with a short length 34 extending beyond the end of the mandrel. The ends are passed under the collar 18 and gathered together under the end plate 26.

As shown in FIGURE 3, round saw 32 comprises a wire with a helical cutting edge. These saws are available in 500 feet lengths and have outside diameters typically ranging from 0.040 to 0.070 inch. They are flexible and will readily conform to curved surfaces. Other cutting tools such as wire cables in which certain strands have been frayed and chain saws may also be used in the practice of the present invention. The tool is sheathed in some easily cut covering, such as lengths of ordinary paper soda straw 36, which will prevent the tool from becoming lodged immovably in the groove after the groove has been faired with some material, such as patching plaster, to give a smooth exterior to the mandrel. For clarity, FIGURES 1 and 2 do not show the fairing material applied over the grooves 30.

Prior to winding the motor case, a suitable parting agent, such as a wax, and a synthetic rubber undercoat are applied over the mandrel. Then, resin impregnated glass filaments are wound either circumferentially or helically (FIGURE 4) on the mandrel in conventional manner. The completed case together with the mandrel is then removed from the winding machine and heated to cure the resin.

Figure 4:
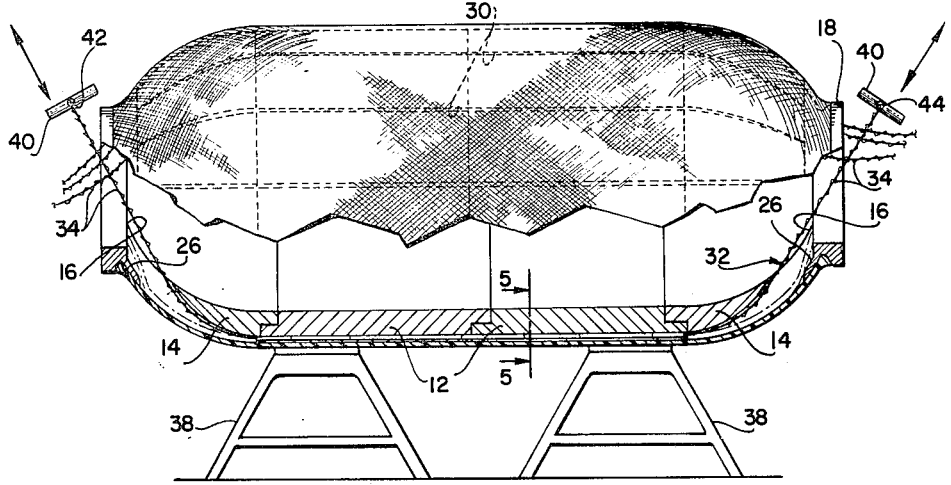
FIGURE 4 is an elevational view, partly in section, of the completed rocket motor case, showing handles attached to the ends of the cutting tool preparatory to disjoining the mandrel.

After cure, the assembly of the motor case and mandrel are placed upon a suitable stand 38 (FIGURE 4). Then, suitable handles 40 provided with a saw-receiving opening 42 and a set screw 44 are furnished for the saw ends at each end of the mandrel. The saws are manipulated so that the cutting will be directed toward the longitudinal axis of the mandrel and away from the motor case. The end sections will thus be cut first and then the body section. The uncut portion of patching plaster has no strength and is easily broken. Since the maximum widths or arcs of the segments are less than the diameter of the end opening 16, the segments are easily removed through the end opening.

As shown in FIGURE 5, the first mandrel segment 46 should be cut as a keystone; that is, the cut should not be radial (dotted lines) but should be offset (solid lines), so that segment 46 will fall free or separate readily from the remainder of the mandrel. After the first segment is cut, it does not matter whether the succeeding cuts are radial or not. Typically, for a mandrel having a thickness of about 3 inches, the individual cuts can be made in 10 minutes or less.

FIGURE 6 shows a method whereby power means may be used to saw the mandrel segments when the mandrels are lengthy or when high speed production is desired. Each saw length used is extended and joined together so that it will describe a continuous band saw 48. After the rocket motor has been fabricated and cured, brackets 50, 52 are attached respectively to the left and right collars 18 by bolts 54. Bracket 50 supports a shaft 56 which carries a guide pulley 58 on an arm 60 fixed to shaft 56. The latter shaft may be moved axially and rotatably with respect to bracket 50 in order to position pulley 58 interiorly of the mandrel for receiving the individual saws 48. After engagement of the saw and pulley, shaft 56 is locked against further movement by key 62. Similarly, bracket 52 supports a shaft 64 carrying a guide pulley 66 on an arm 68 secured to the shaft. Shaft 64 is supported at the other end by a stand 70 having a flanged bearing collar 72 for the shaft. Shaft 64 may be rotated to position pulley 66 for receiving the individual saws 48. After engagement of the saw and pulley, shaft 64 is locked against further rotational movement by a pin 74 which is insertable at various points in the flange of collar 72 and in a matching flange of a second collar 76 fixed to the shaft. Shaft 64 additionally carries a sleeve member 78 to which is attached a power pulley 80 driven by a power source shown generally as 82. The power source may comprise an air motor or an electric motor. Appropriate handles 83 are provided on the sleeve member for properly positioning the power pulley 80 in relation to the saws and to the guide pulleys 58, 66 and for moving the member along the shaft 64 in the direction shown to take up the slack as the sawing progresses. Other power means such as a reciprocating saw means may also be used.

FIGURE 7 shows the use of the present invention in the manufacture of a rocket motor 90 with a closed end 92, generally in a hemispheroidal shape. In this case, the longitudinal grooves are cut to go through the apex 94 of the end section 92 and then continued on the other side of the mandrel. Both ends 96 of cutting tool 98 placed in the grooves will terminate in the end opening 100. Here, since the separate tools 98 will be superimposed at the apex, it is important that the tools be properly sequenced so that they will not cut through each other at the apex. In the sawing operation, by pulling handles 40 in the directions shown, the end sections will be cut through first and then the cylindrical body section. In order to maintain the proper tension on the tool after the end sections are cut, a guide pulley 102 mounted on a bracket 104 is used to support the tool adjacent the end portion 92. Bracket 104 is mounted on rotatable shaft 106 suitably supported on stand 108.

In FIGURES 8 and 9, the present invention is further illustrated in the manufacture of a piece of aircraft ducting shown generally at 110. The ducting is made of plies of resin-impregnated glass fiber cloth 112 which are laid up on the mandrel 114 of the present invention. To provide the proper strength and rigidity, ducting 110 contains reinforcing beads 116 at the ends and also in the middle. Mandrel 114 accordingly has raised portions 118 on which the beads 116 are laid up. It will be apparent that after the ducting has been cured, mandrel 114 will be locked in the ducting by beads 116. However, by prior placement of cutting tools 120 in longitudinal grooves 122 in the mandrel 114, the latter can be easily cut into sections and removed from the finished ducting. Any plaster remaining in the bead areas can be readily removed by light tapping.

In the above application of the present invention, as well as in the other applications, the cutting tools need not be sheathed; alternatively, they can be simply placed in the grooves, and the grooves can be covered with a strip of masking tape, a thin piece of plastic, or similar material to prevent the resin from entering the grooves and immobilizing the tools. The purpose of the sheathing or covering over the groove is to keep the tools mobile in the mandrel so that they may be readily manipulated after fabrication of the article. However, for purposes of illustration, FIGURES 8 and 9 show cutting tools 120 sheathed and the grooves 122 faired with plaster.

Thus, it will be apparent that the improved mandrel of the present invention has wide utility in the fabrication of plastic, reinforced plastic, and like articles. Although the present invention has been described hereinbefore primarily in conjunction with a mandrel made of plaster, it being the preferred material, the present invention may also be utilized with mandrels made of plaster-like materials such as plastic, reinforced plastics, papier-mache, cement-plaster mixtures, and the like. Other modifications and variations will be apparent to those skilled in the art. It is therefore to be understood that the scope of the present invention is to be limited only by the appended claims.

I claim:
1. A plaster mandrel for a glass filament wound rocket motor case comprising: a hollow, cylindrical body section; generally hemispheroidal, hollow end sections attached to the body section; one of said end sections having a central opening and the other being closed; longitudinal grooves in the surface of said body section at circumferential intervals less than the diameter of the central opening; said grooves extending into the end sections and passing through the apex of the closed end section; paper-enclosed round saws embedded in said grooves and adapted to be manipulated at the open end of the mandrel for cutting the mandrel into segments; and a fairing over the grooves to provide a smooth mandrel exterior.

2. A plaster mandrel for a glass filament wound rocket motor case comprising: a hollow cylindrical body; generally hemispheroidal end closures for the body, at least one of the closures having a central opening; longitudinal grooves in the surface of the body at circumferential intervals less than the diameter of the centraal opening, said grooves being extended into the end closures; paper-enclosed round saws embedded in said grooves for cutting the mandrel into segments; and a fairing over the grooves to provide a smooth mandrel exterior.

3. A plaster mandrel for a glass filament wound rocket motor case comprising: a hollow cylindrical body; generally hemispheroidal end closures for the body, at least one of the closures having a central opening; longitudinal grooves in the surface of the body and end closures; said grooves being spaced in the body at circumferential intervals less than the diameter of the central opening; cutting tools embedded in said grooves for cutting the mandrel into segments; and protective means for the tools to maintain their mobility in the mandrel.

4. A mandrel for a ducting made of resin-impregnated glass fiber cloth laminate and having reinforcing beads and a duct opening, said mandrel comprising: a hollow, plaster body, said body having peripheral raised portions at predetermined locations on the body for forming the beads; longitudinal grooves in the exterior surface of the body, said grooves being spaced apart a distance less than the diameter of the duct opening; paper enclosed round saws embedded in the grooves for cutting the mandrel into segments; and a fairing over the saws to provide a smooth mandrel exterior.

5. A mandrel for a ducting made of resin-impregnated glass fiber cloth laminate and having reinforcing beads and a duct opening, said mandrel comprising: a hollow, plaster body, said body having peripheral raised portions at predetermined locations on the body for forming the beads; longitudinal grooves in the exterior surface of the body, said grooves being spaced apart a distance less than the diameter of the duct opening; cutting tools embedded in the grooves for cutting the mandrel into segments; and a covering for the grooves to prevent resin entry into the grooves.

6. A mandrel for an open-ended vessel having a configuration which prevents removal of the mandrel as a whole through the open end, said mandrel comprising: a hollow plaster body shaped to produce the vessel in its desired configuration; a plurality of grooves extending longitudinally on the exterior surface of the body, said grooves being spaced apart a distance which will demarcate said body into segments which are removable through the open end; and a cutting tool embedded in each of said grooves, said tool having ends protruding beyond the body for manipulating the tool to cut the body into said segments.

References Cited by the Examiner
UNITED STATES PATENTS

| | | |
|---|---|---|
| 2,343,292 | 3/1944 | Greneker. |
| 2,550,836 | 5/1951 | MacHenry _____ 18—45 |
| 2,657,447 | 11/1953 | Pellanda. |
| 2,677,165 | 5/1954 | Copenhaver et al. |
| 2,744,043 | 5/1956 | Ramberg _____ 156—155 |
| 3,020,615 | 2/1962 | Peters _____ 18—45 |

EARL M. BERGERT, *Primary Examiner.*